Jan. 12, 1926. 1,569,397
I. W. ROBERTSON
METHOD OF REMOVING METALLIC STRAPS FROM BALES
Filed March 9, 1925
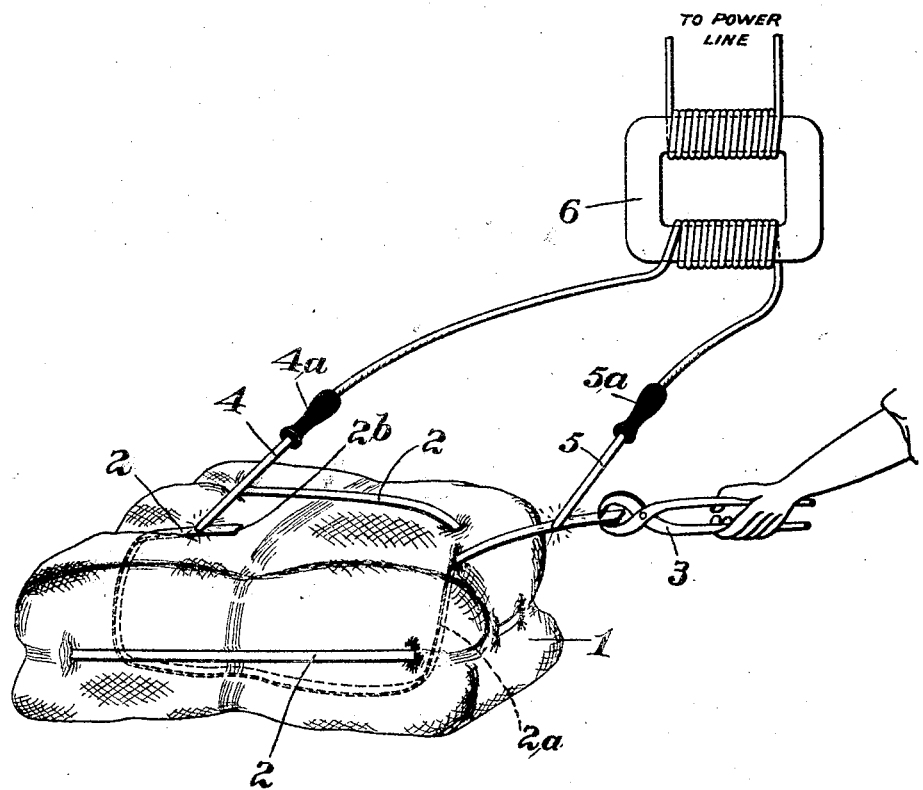
Inventor:
Isaac W. Robertson,
by Spoon Middleton Donaldson & Hall
Attys.

Patented Jan. 12, 1926.

1,569,397

UNITED STATES PATENT OFFICE.

ISAAC W. ROBERTSON, OF AKRON, OHIO, ASSIGNOR TO THE MILLER RUBBER COMPANY, OF AKRON, OHIO, A CORPORATION OF OHIO.

METHOD OF REMOVING METALLIC STRAPS FROM BALES.

Application filed March 9, 1925. Serial No. 14,313.

*To all whom it may concern:*

Be it known that I, ISAAC W. ROBERTSON, a citizen of the United States, and resident of Akron, in the county of Summit and State of Ohio, have invented certain new and useful Improvements in Methods of Removing Metallic Straps from Bales, of which the following is a specification.

My present invention relates to a method of removing metallic baling straps or wires from bales of rubber or other electrically non-conducting and tenacious materials.

The invention is particularly designed for use in removing the iron straps or bands from bales of rubber where through long contact with the bales the straps have become embedded therein and the material has adhered so tenaciously to the band that removal of the same is extremely difficult. Bales of crude rubber are often subjected to heavy pressure and more or less heat during shipment thereof, on both steamships and railroads, or where stored in warehouses so that the original shape of the bales is distorted to such an extent as to cause the rubber to flow around the baling straps and the straps to become embedded in the rubber to a greater or less extent, oftentimes at places several inches below the surface of the rubber. Since unvulcanized rubber is quite sticky or tacky, under such conditions it adheres to the straps or bands to such an extent that it is impossible to remove the same from the band without cutting the rubber away from the straps, which procedure involves a material amount of labor at a prohibitive expense.

According to the present invention, I heat the straps to such an extent as to soften the rubber immediately surrounding the same whereupon the strap, having been severed, is easily pulled or removed from the bale.

In order that my invention may be better understood I have appended hereto a sheet of drawings in which—

The figure illustrates in a diagrammatic manner, how my invention would be carried out.

Referring by reference characters to this drawing, the numeral 1 indicates a bale and 2 the straps or bands thereof. I have found that a convenient manner of carrying out my invention is to apply electric heat to the bands which may be conveniently effected by the use of electrodes 4 and 5 provided with suitable insulated handles $4^a$ and $5^a$, the electrodes being connected by suitable conductors to any suitable source of electric current, such as indicated conventionally at 6. In carrying out my improved method, one of the bands 2 would be severed at a convenient point and the end thereof grasped by a suitable tool, as for example, a pair of pliers 3, and the electrodes 4 and 5 would be applied to the severed ends. The current flowing through the band heats the same and softens the rubber immediately surrounding it sufficiently to enable it to be pulled through or away from the rubber. If the band is completely embedded in the rubber, the continued pull upon the hot band causes it to work its way readily through the rubber until it is completely removed.

In actual practice it is found that the heat actually reduces a small amount of rubber in immediate contact with the straps to an oily consistency which actually lubricates the straps and facilitates their removal.

While I have, in the foregoing specification, referred to the invention as particularly adapted for use in removing straps from rubber bales, it will be understood that it is applicable to any non-conducting material which tends to adhere to the bale bands, and it is immaterial whether these bands be in the form of straps or irons. It will also be understood that while I have disclosed in the drawing an electrical heating means in the shape of a transformer, the primary of which may be connected to the power line and the secondary wound to give sufficient current to heat the straps to the desired amount in the proper interval of time, I do not limit myself to any specific means of applying the electric current, nor in fact to the use of electricity as the heating means.

Having thus described my invention, what I claim is:—

1. The hereindescribed method of removing metal baling bands from bales of non-conducting and tenacious materials, which consists in heating the bands sufficiently to break the adhesive bond between the bands and bale material, and thereafter removing the band.

2. The hereindescribed method of removing metal baling bands from bales of non-conducting and tenacious materials, which consists in electrically heating the bands sufficiently to break the adhesive bond between the bands and bale material, and thereafter removing the band.

3. The hereindescribed method of removing metal baling bands from bales of non-conducting and tenacious materials, which consists in severing the band, heating the band by heating means applied to the ends thereof, and thereafter stripping the band.

4. The hereindescribed method of removing metal bands from bales of non-conducting material, which consists in severing the band, heating said band by applying to the ends thereof electrodes for supplying an electric current, and thereafter stripping the band.

In testimony whereof I affix my signature.

ISAAC W. ROBERTSON.